United States Patent
Daverman et al.

(10) Patent No.: US 7,784,366 B2
(45) Date of Patent: Aug. 31, 2010

(54) SINGLE SIDED CAPACITIVE FORCE SENSOR FOR ELECTRONIC DEVICES

(75) Inventors: Dodge Daverman, Chicago, IL (US); David Cranfill, Antioch, IL (US); Michael Olley, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 47 days.

(21) Appl. No.: 12/181,923

(22) Filed: Jul. 29, 2008

(65) Prior Publication Data
US 2010/0024573 A1 Feb. 4, 2010

(51) Int. Cl.
*G01L 1/12* (2006.01)
(52) U.S. Cl. .................... 73/862.626; 73/780
(58) Field of Classification Search ........... 73/760–780, 73/862.626
See application file for complete search history.

(56) References Cited

U.S. PATENT DOCUMENTS

| | | | | |
|---|---|---|---|---|
| 4,030,813 A | * | 6/1977 | Kohashi et al. | 359/245 |
| 4,852,443 A | * | 8/1989 | Duncan et al. | 84/733 |
| 5,383,364 A | * | 1/1995 | Takahashi et al. | 73/514.32 |
| 5,397,911 A | * | 3/1995 | Hiyama et al. | 257/415 |
| 5,510,813 A | | 4/1996 | Makinwa et al. | |
| 5,750,904 A | | 5/1998 | Doemens et al. | |
| 5,942,692 A | * | 8/1999 | Haase et al. | 73/724 |
| 6,532,824 B1 | | 3/2003 | Ueno et al. | |
| 6,960,945 B1 | * | 11/2005 | Bonin | 327/111 |
| 6,989,677 B2 | * | 1/2006 | Morimoto | 324/660 |
| 7,279,647 B2 | * | 10/2007 | Philipp | 200/5 R |
| 2003/0160768 A1 | | 8/2003 | Tanabe et al. | |
| 2004/0027761 A1 | | 2/2004 | Toshiharu et al. | |
| 2007/0229464 A1 | | 10/2007 | Hotelling et al. | |

FOREIGN PATENT DOCUMENTS

KR   10-2003-0077470   10/2003

OTHER PUBLICATIONS

Kipo, PCT Search Authority, "PCT Search Report and Written Opinion for PCT/US2009/049758", Filed July 7, 2009, *Motorola, Inc.* et al., Applicant, Mailed Feb. 25, 2010.

* cited by examiner

*Primary Examiner*—Max Noori
(74) *Attorney, Agent, or Firm*—Gary J. Cunningham; Philip H. Burrus, IV

(57) ABSTRACT

A capacitive force sensor (100) includes a substrate (101) having at least one electrode pair (102,103) defining a capacitance disposed thereon. The substrate (101) is fixed relative to a first plate (106). A drive circuit (104) is configured to apply a voltage relative to a circuit ground (105) to the electrode pair (102,103). The first plate (106) is separated from a second plate (107) that is coupled to circuit ground (105) by a compliance member (108,109). The compliance member (108, 109) is configured to oppose a compression force (110) while allowing the first plate (106) to physically move relative to the second plate (107). A capacitive detection circuit (111) is then configured to detect a change the capacitance when the compliance member (108,109) is compressed. The compression force (110) is then determined from the change in capacitance and the spring constant of the compliance member (108,109).

9 Claims, 5 Drawing Sheets

SINGLE SIDED CAPACITIVE FORCE SENSOR FOR ELECTRONIC DEVICES

BACKGROUND

1. Technical Field

This invention relates generally to capacitive sensors, and more particularly to a capacitive force sensor employing a capacitor pair disposed on a substrate to determine an amount of contact force.

2. Background Art

Portable electronic devices, including mobile telephones and personal digital assistants (PDAs), are becoming more sophisticated as the technology associated with these devices has continued to advance. For example, until recently, the user interface for a mobile telephone included twelve to fifteen mechanical buttons. Today, however, many portable devices include full QWERTY keypads. Further, some portable electronic devices employ touch sensitive screens that have no mechanical keys at all. Rather than pressing a mechanical button, the user simply touches a plastic or glass surface. Touch sensing circuits such as capacitive touch sensors then determine the location of the user's finger or stylus. A processor then correlates the position of the finger or stylus with a virtual keypad to determine keystrokes. Such capacitive sensors are described, for example, in commonly assigned, copending U.S. patent application Ser. No. 11/679,228, filed Feb. 27, 2007, entitled "Adaptable User Interface and Mechanism for a Portable Electronic Device," which is incorporated herein by reference.

While capacitive touch sensors are useful for determining the geometric location of objects like fingers and styluses, they do not provide an indication of the contact force being applied. In many devices, force sensitive resistors or switches must be used to detect contact force. However, when the user interface comprises only a fixed piece of glass or plastic, force sensitive resistors exhibit some less desirable properties. For example, force sensitive resistors have a generally non-linear response that is dependent upon material and manufacturing tolerances. Additionally, force sensitive resistors are costly, thereby increasing the cost of the overall electronic device.

There is thus a need for an improved, lower cost touch sensitive interface that is capable of detecting and determining a contact force.

Figure 1:
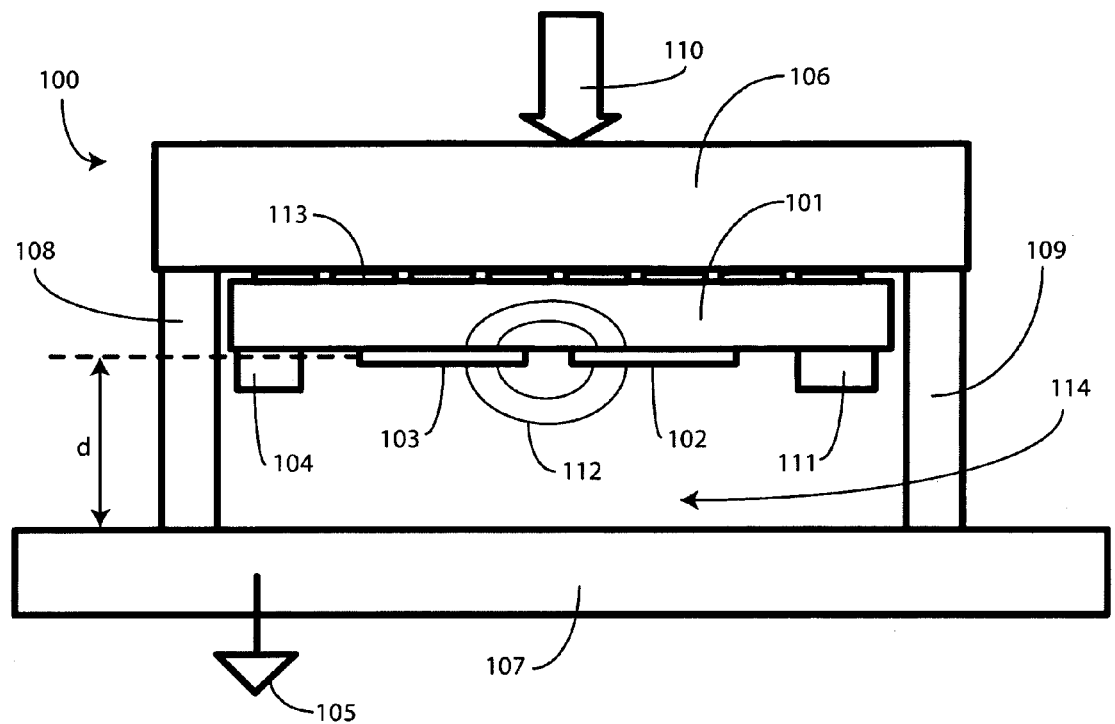
FIG. 1 illustrates one example of a capacitive force sensor in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to capacitively detecting a contact force. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of embodiments of capacitive force detection as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a system for capacitively detecting a contact force that is placed upon a touch sensitive user interface, such as a touch sensitive user interface for a portable electronic device. One embodiment of the system includes a compliance member, such as a spring or foam gasket, and a system for detecting a change in capacitance. The compliance member establishes a gap between one or more sets of electrodes and a reference ground plane. The compliance member further establishes a relationship between the applied force and the gap height.

In one embodiment, the capacitive sensing circuit includes at least two electrodes. For simplicity of discussion, these electrodes will be referred to herein as an "X" electrode and a "Y" electrode. In one embodiment, the X and Y electrodes are disposed in the same plane. For example, they can be disposed on a substrate. Suitable substrates include a flexible substrate, such as polymer-encapsulated copper, or a rigid substrate, such as FR4-type fiberglass. By disposing both the X electrode and the Y electrode on one substrate (note that they may be disposed on various layers of the substrate), the X and Y electrodes are disposed on a single side of an air gap that exists between the electrodes and the reference ground plane.

When a drive circuit excites one of the electrodes, for instance the X electrode, an electric field is established between the X and Y electrodes. This electric field defines an "X electrode to Y electrode" capacitance that can be measured with a capacitive sensing circuit. Capacitive sensing circuits are known in the art. One example of a capacitive sensing circuit is a charge-transfer capacitive sensing circuit, although it will be obvious to those of ordinary skill in the art having the benefit of this disclosure that other equivalent capacitive sensing circuits may also be used.

In one embodiment, the compliance member establishes a gap between the X-Y electrode pair and a reference ground plane. The reference ground plane can be simply a conductive section of material that is tied to the circuit ground or common node. When the X electrode is driven, electric fields are established not only between the X and Y electrodes, but also between the X electrode and the reference ground plane and between the Y electrode and the reference ground plane. When the compliance member is compressed, perhaps as a result of a contact force incident upon the user interface, the gap between the X and Y electrodes decreases. As a result, the coupling between the X electrode and ground and the Y electrode and ground increases, thereby decreasing the measurable X-Y capacitance. Thus, the compliance member establishes a relationship between contact force and displacement. The capacitive detection circuit can then sense changes in displacement. By measuring the capacitance change between X and Y electrodes, the system can determine the change in displacement, and thus determine the force applied to the input surface.

Turning now to FIG. 1, illustrated therein is one embodiment of a capacitive force sensor 100 in accordance with the invention. The capacitive force sensor 100 includes a substrate 101 having at least one electrode pair 102,103 disposed thereon. In one embodiment, the electrode pair 102,103 comprises a plurality of electrode pairs. The number and placement of the electrode pair 102,103 will depend upon application. The plurality of electrode pairs can be placed in a arrayed configuration. Additionally, the plurality of electrode pairs can be strategically placed along the substrate, such as beneath icons or user actuation targets.

As noted above, the substrate 101 can be either a flexible substrate or a rigid substrate. For instance, in one embodiment the substrate 101 is a printed wiring board, such as an FR4 circuit board or a polymer encapsulated flexible substrate. In such an embodiment, the electrode pair 102,103 can either be deposited upon the substrate 101 or etched by traditional printed wiring board fabrication techniques. Note that the electrodes of the electrode pair 102,103 can be disposed on different layers of a multilayered substrate.

In such a configuration, the electrode pair 102,103 is disposed along the same side of the air gap 114 that exists between a plate 107 and the electrode pair 102,103. This "one-sided" capacitive sensing arrangement offers numerous advantages. First, it is very cost effective as substrate-based electrodes are inexpensive to fabricate. When the conductive traces of the printed wiring board are etched, it simply involves changing a mask to add electrodes where needed. There is no need to build a complex electrical structure having large metal capacitor plates that move relative to each other and that must be tuned during manufacture. The conductive traces further take advantage of ground planes that are often inherent in electronic assemblies.

Second, when both electrodes 102,103 are disposed on a single side of the substrate 101, the electrical connection to each electrode is simplified as the traces from drive circuits can be manufactured when the electrodes themselves are manufactured. Note that in many applications, where an array of electrode pairs are used with the capacitive force sensor 100, a multilayered substrate will beneficial in that one layer can be used for electrodes and another to route electrically conductive traces between the electrodes and the circuitry components.

Third, conductive planes in the substrate stack can serve as shields to prevent outside objects from interfering with the capacitive measurement.

Figure 2:
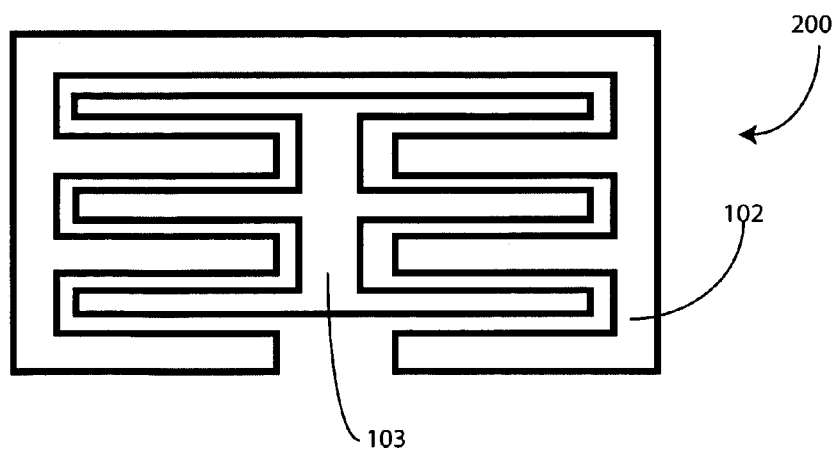
FIG. 2 illustrates one example of a capacitive electrode pattern, suitable for deposition on a substrate, in accordance with embodiments of the invention.

Turning briefly to FIG. 2, illustrated therein is one exemplary embodiment of an electrode pattern 200 suitable for use with embodiments of the invention. The electrode pattern 200 includes the X electrode 102 and the Y electrode 103. In the illustrative embodiment of FIG. 2, the X electrode 102 and Y electrode 103 are disposed in the same plane, on the same side of a substrate, in a multi-finger, interlaced configuration. Note that this is but one electrode pattern 200 suitable for use with the invention. Others will be obvious to those of ordinary skill in the art having the benefit of this disclosure. For instance the X electrode 102 may be placed on one layer of the substrate, while the Y electrode 103 is placed on another.

Turning back to FIG. 1, the substrate 101 is coupled to a first plate 106. A variety of materials can be used to manufacture the first plate 106, including glass, plastic, metal, fiberglass, or other materials. The first plate 106 can include shielding, such as a conductive material layer, configured to shield the electrode pair 102,103 from capacitively coupling with objects proximately located with the first plate 106. (To a capacitive sensor, objects such as a user's finger can operate like a ground plane. As such, one suitable location for the capacitive force sensor 100 in an electronic device is beneath a display, such as a liquid crystal display, where it is shielded from the effects of the user's finger. While liquid crystal displays are one suitable display for shielding the capacitive force sensor 100, it will be obvious to those of ordinary skill in the art having the benefit of this disclosure that other displays, including organic light emitting diode displays can also be used. In addition to using a display for shielding, another option is to use shielding in the first plate 106.) By way of example, the first plate 106 can include an electrical shield, such as metal. Where used, this metal is tied either to circuit ground 105, or is coupled to a signal rail of the drive circuit 104.

Note that where shielding is desired, the substrate 101 can also be configured to shield the electrode pair 102,103 from capacitively coupling with objects proximately located with the first plate 106. For instance, the side of the substrate 101 opposite the electrode pair 102,103 can have an electrode mesh 113, e.g., rows and columns of circles or squares of conductive material, evenly spaced and disposed thereon and located directly opposite the electrode pair 102,103. This mesh can then be coupled to the drive electrode 102, i.e. the X electrode, so as to be driven by the drive circuit 104 when the X electrode is driven, or to the other electrode 103. Such a configuration as the effect of increasing the initial capacitive coupling between the X and Y electrodes, thereby increasing the sensitivity of the sensor.

The mechanical connection between the substrate 101 and the first plate 106 is such that the electrode pair 102,103 is fixed, physically, relative to the first plate 106. For instance, the substrate 101 may be mechanically coupled to the first plate 106 such that the distance between the first plate 106 and the electrode pair 102,103 remains constant as forces are applied to the capacitive force sensor 100. Suitable coupling between the first plate 106 and the substrate 101 include adhesives and glues.

A drive circuit 104 is configured to apply a voltage having amplitude measured relative to a circuit ground 105 to one of the electrodes 102,103. In one embodiment, the drive circuit 104 may be disposed along the substrate 101. In other embodiments, the drive circuit 104 may be disposed at other locations, with electrical leads passing across the substrate 101 coupling the electrodes 102,103 and the drive circuit 104. The drive circuit 104 can be configured, for example, to provide a characteristic, frequency-based signal to the X electrode 102. Exemplary signals include AC waves, square waves, step functions, or other suitable signals varying in time.

A compliance member, shown in FIG. 1 as compliance members 108,109, is disposed between the first plate 106 and a second plate 107. In one embodiment, the second plate 107 comprises an electrically conductive material, such as copper or nickel, which is coupled to circuit ground 105. This ground coupling, as will be described below, can then be used to change the shape of the electric field lines associated with the electrode pair 102,103. When the first plate 106 and the second plate 107 move together, the second plate 107 essentially changes the shape of the electric field lines 112 established between the electrode pair 102,103. This changed shape of the electric field lines 112 is measured as a change in capacitance of the electrode pair 102,103.

The compliance member 108,109 is configured to mechanically separate the first plate 106 from the second plate 107, while allowing the first plate 106 to physically move relative to the second plate 107 in response to a compression force 110. Note that while the compression force 110 is shown in FIG. 1 as being applied to the first plate 106, the capacitive force sensor 100 could be inverted, with the compression force 110 being applied to the second plate 107.

In one embodiment, the compliance member 108,109 comprises a compressible gasket, such as a gasket made from an elastomer like foam rubber. It will be clear to those of ordinary skill in the art having the benefit of this disclosure, however, that the invention is not so limited. Other spring-type devices can be employed, either alone or in combination, as the compliance member 108,109. Further, the material or devices used as the compliance member 108,109 can be tailored to enhance the movement of the two plates 106,107 relative to each other. For instance, a compressible gasket can be combined with a leaf spring or spring washer to provide a non-isotropic response where the dynamic characteristics of the plates 106,107 moving together is different from that when the plates 106,107 are moving apart. A designer may desire that one be faster than another. Alternatively, the designer may desire a non-linear response. For example, the designer may desire an initially quick movement of the plates 106,107, with a subsequent slow movement. Combinations of materials, e.g., foam, metal, rubber, etc., can be used to provide such a response.

A capacitive detection circuit 111 is then coupled to the electrode pair 102,103. The capacitive detection circuit 111 is configured to detect a measure or indication of capacitance of the electrode pair 102,103 in response to the application of a signal by the drive circuit 104. As such, the capacitive detection circuit 111 can detect a change in the capacitance when the compliance member 108,109 is compressed. The capacitance changes because the magnitude of coupling between each electrode of the electrode pair 102,103 and ground varies with the distance between the electrode pair 102,103 and the grounded, second plate 107. As such, a relationship exists between the capacitance and displacement of the first plate 106. The capacitive detection circuit 111, by determining the change in capacitance between a rest position of the plates 106,107 and a compressed position of the plates 106,107, can determine a change in capacitance. Where the spring constant of the compliance member 108,109 is known, this change in capacitance can be converted into a displacement value.

Figure 3:
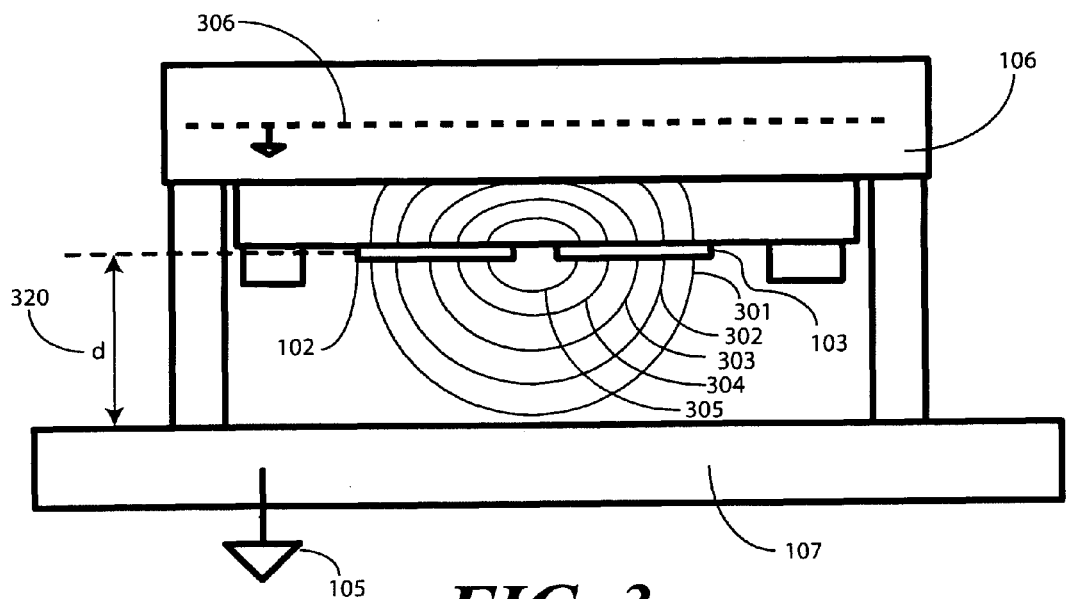
FIGS. 3 and 4 illustrate one embodiment of a capacitive force sensor in accordance with the invention at rest and under compression, respectively, and the electric field lines associated therewith.
Figure 4:
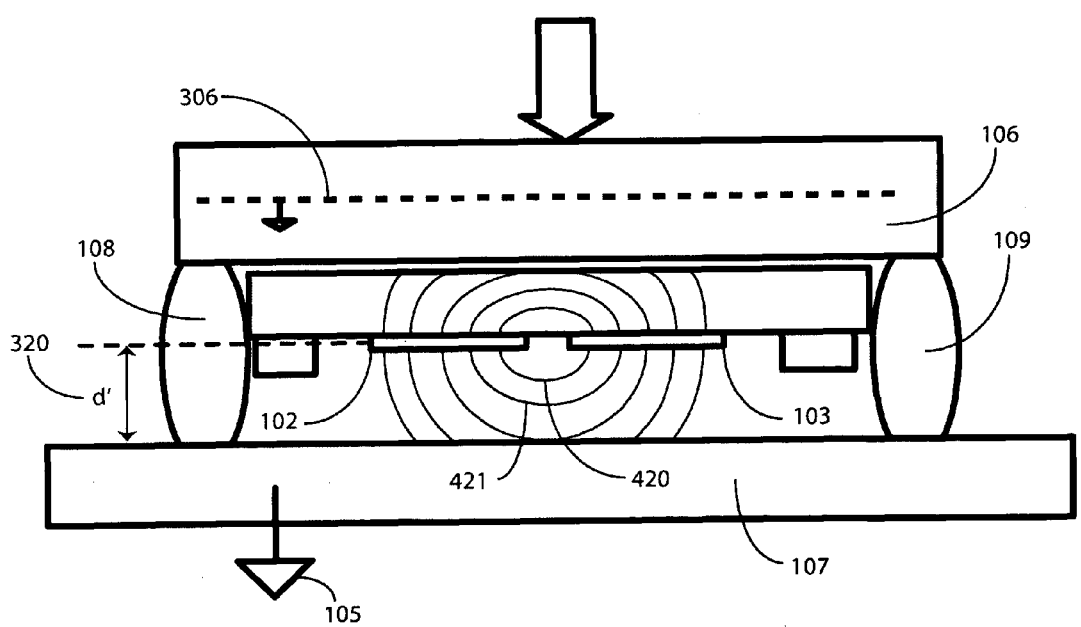

Turning now to FIGS. 3 and 4, the displacement determination can be more readily seen. FIG. 3 illustrates one embodiment of a capacitive force sensor 100 in accordance with an embodiment of the invention at rest, while FIG. 4 illustrates the capacitive force sensor 100 in a compressed state due to a compression force 110 being applied to the first plate 106. In the embodiments shown in FIGS. 3 and 4, the first plate 106 comprises an electrically conductive material layer 306 that is coupled to circuit ground. (Note that the first plate 106 could equally be coupled to a signal line, such as to the X electrode.) The second plate 107 comprises a metal plate, such as a steel plate for example, that is coupled to circuit ground 105.

In FIGS. 3 and 4, the electric field established when the drive circuit (104) applies a signal to one of the electrodes 102,103 is illustrated by field lines. In FIG. 3, field lines 301,302,303,304,305 represent the resting field. These lines 301,302,303,304,305 couple between the electrodes 102,103 when the plates 106,107 are a rest distance 320 apart.

Figure 5:
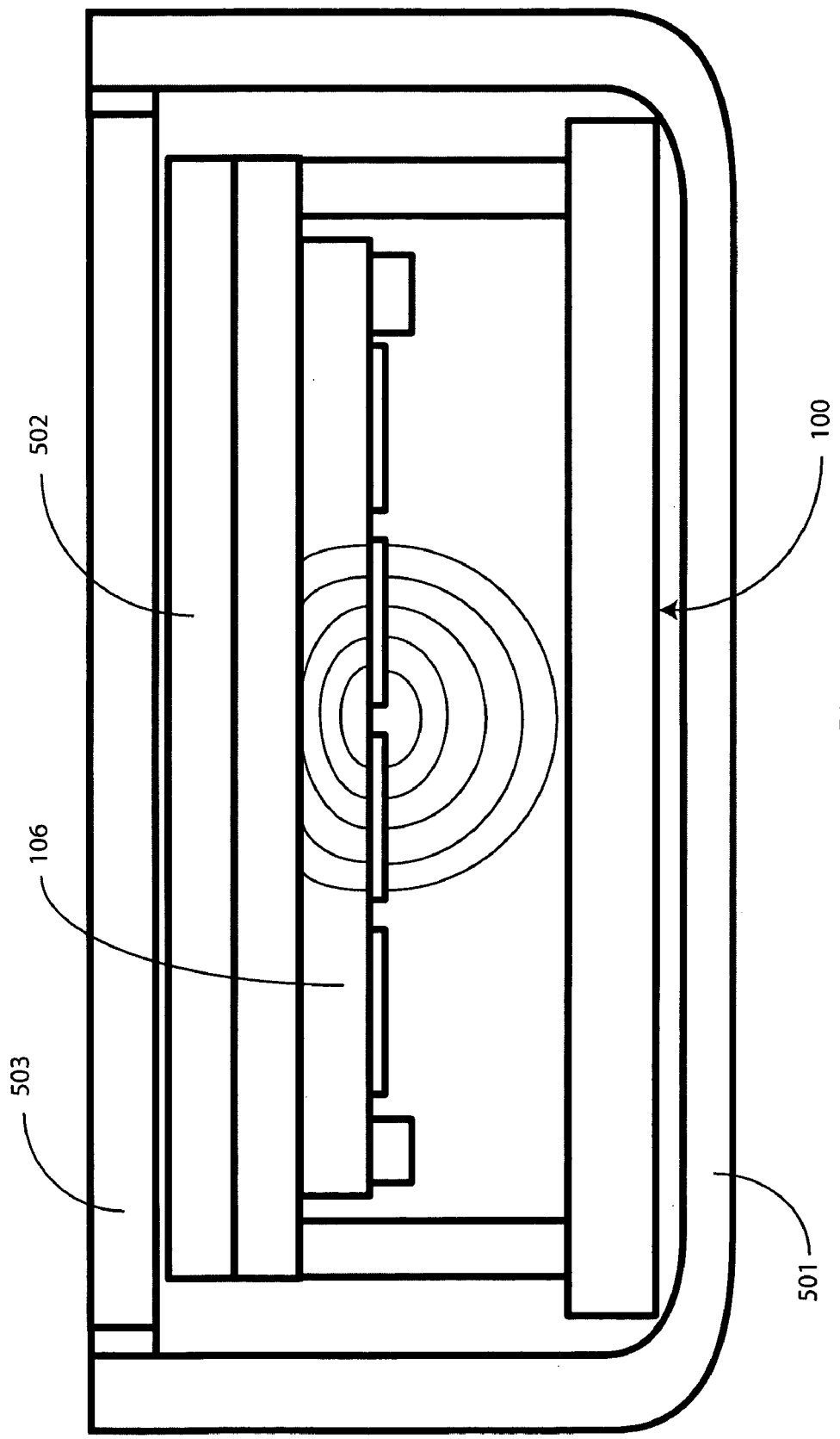
FIG. 5 illustrates one example of a touch sensitive user interface, suitable for use with an electronic device, in accordance with embodiments of the invention.

Turning to FIG. 4, when the plates 106,107 are compressed, the distance 420 between the electrodes 102,103 and the second plate 107 decreases. As the second plate 107 is coupled to circuit ground 105, this plate 107 shorts some of the lines. As a result, the shape of the electric field changes—this is illustrated as fewer electric field lines coupling between the electrodes 102,103. In FIG. 4, field lines 401,402 represent this field. The application of a compression force 110 causes a deformation of the compliance member 108, 109 resulting in a displacement (illustrated by the difference between distance 320 and distance 420) of the electrodes 102,103 relative to the steel plate 107. This displacement is then sensed by the capacitive detection circuit (111) as a reduction in the capacitance between the electrode pair 102, 103. A processing circuit is able to make the simple capacitance to displacement calculation using the spring constant of the compliance member 108,109.

Where both contact force and contact position need to be measured, a capacitive touch sensor can be incorporated with the capacitive touch sensor. Turning now to FIG. 5, illustrated therein is such an embodiment. While a capacitive touch sensor will be used herein as one suitable "touch position" determining device, it will be clear to those of ordinary skill in the art having the benefit of this disclosure that the invention is not so limited. Other touch sensors may also be used, including but not limited to an optical sensor, a surface acoustic wave sensor, or a resistive touchscreen.

In FIG. 5, the capacitive force sensor 100 of FIG. 1 can be seen. The capacitive force sensor 100 is seated in a housing 501 of a portable electronic device, such as a mobile telephone or PDA. A capacitive touch sensor 502 is disposed above the first plate 106 and beneath a fascia member 503 that serves as a major face of the electronic device. In one embodiment, the fascia member 503 can be configured to move slightly relative to the housing 501 to accommodate the actions of the capacitive force sensor 100. In such an embodiment, a seal, coupling, or gasket may be used to seal the the fascia member 503 to the housing 501. The touch sensor 502, which can be a capacitive touch sensor, is configured to detect the proximate position of an object along the device.

The fascia member 503 is a covering or housing, which may or may not be detachable, for an electronic device. Where the electronic device includes a touch sensitive input, the fascia member 503 is configured to receive the "touch" of a finger or stylus of the user. In one exemplary embodiment, the fascia member 503 is a thin, rigid material, such as reinforced glass or plastic. In other embodiments, a thin flexible material, such as clear or translucent plastic film can be used. To provide ornamentation, text, graphics, and other visual indicators, selective printing can be disposed on the rear face of the fascia member 503. Printing may be desired on the front face for various reasons as well. For example, a subtle textural printing or overlay printing may be desirable to provide a translucent matte finish atop the electronic device. Such a finish is useful to prevent cosmetic blemishing from sharp objects or fingerprints. The fascia member 503 may also include an ultra-violet barrier or other filter as well.

Where a capacitive touch sensor is used as the touch sensor 502, in one embodiment the capacitive touch sensor is constructed by depositing small capacitive plate electrodes on a substrate, is configured to detect the proximate position of an object along the first plate 106 (or the second plate 107, where the capacitive force sensor 100 is inverted). For example, indium-tin oxide electrodes can be printed on a substrate. Control circuitry within the device detects a change in the capacitance of a particular plate combination on the touch sensor 502 when a user's finger or stylus is proximately located with the fascia member 503. The touch sensor 502 may be used in a general mode, for instance to detect the general proximate position of an object relative to the fascia member 503, although the capacitive force sensor 100 can provide this functionality. More often, the touch sensor 502 will be used in a specific mode, where a particular capacitor plate pair may be detected to detect the location of an object along length and width of the fascia member 503.

Note that the touch sensor 502 and the capacitive force sensor 100 can be integrated into a single component. By using a multi-layer substrate, such as a multi-layer printed wiring board, the various capacitive sensors and shields can be incorporated onto a single substrate. For instance, the at least one electrode pair (102,103) of the capacitive force sensor 100 used to measure force can be disposed along the underside of such a printed wiring board. Shielding, where needed, can be incorporated as an inner layer of the printed wiring board. Capacitive sensors for the touch sensor 502 can then be placed atop the printed wiring board.

Figure 6:
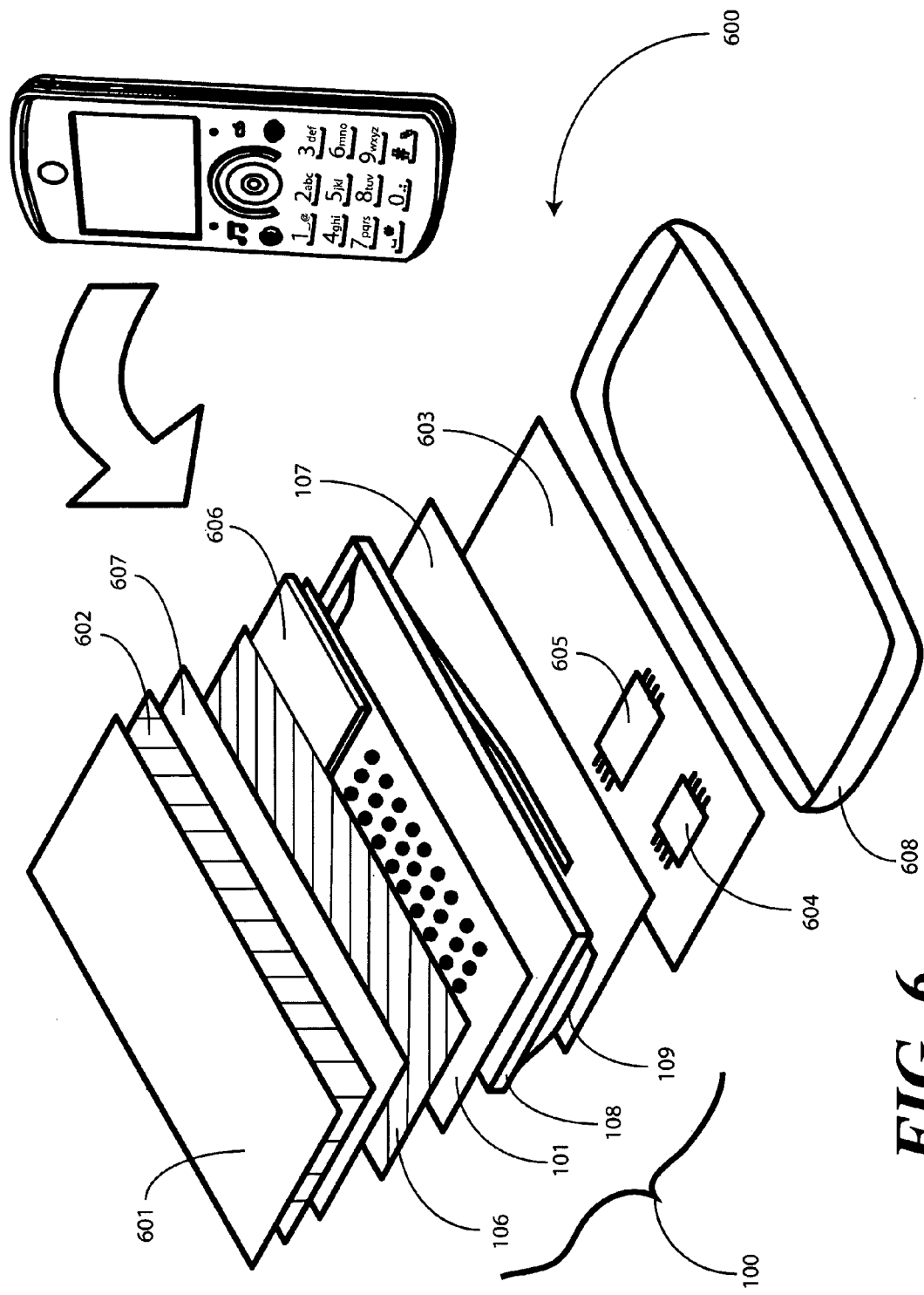
FIG. 6 illustrates an exploded view of one electronic device having a touch sensitive user interface in accordance with embodiments of the invention.

Turning now to FIG. 6, illustrated therein is an exploded view of an electronic device 600, such as a mobile telephone, personal digital assistant, or portable computer, having at least a capacitive force sensor 100 for determining contact force in accordance with embodiments of the invention. For discussion purposes, the electronic device 600 of FIG. 6 will be described as one with a touch sensitive interface. Such devices are suitable applications for capacitive touch sensors described herein. It will be clear to those of ordinary skill in the art having the benefit of this disclosure, however, that this is not the only application with which the capacitive force sensor 100 can be used. Other user interfaces, including those having keypads or other controls, also will find benefit from embodiments of the present invention.

Starting from the top of the electronic device 600, a fascia member 601 is configured to receive touch input from a user. The fascia member 601 spans at least a portion of the electronic device. In one embodiment, the fascia member will span a major face—or a portion thereof—of the electronic device 600. The fascia member 601 may be manufactured from reinforced glass, plastic, or other suitable materials. In one embodiment, the fascia member 601 is a rigid fascia member, and includes an electrically conductive material, such as indium-tin-oxide material, that is coupled to a ground node within the electronic device 600 for shielding.

Next, the electronic device 600 includes an optional capacitive touch sensor layer 602. The capacitive touch sensor layer 602 can be included when it is desirable to determine not only contact force received from the user, but the position of the user's contact as well. The capacitive touch sensor layer 602 is disposed beneath at least a portion of the fascia member 601, such as within a user interface region. The capacitive touch sensor layer 602 is configured to detect a position along the electronic device 600 that corresponds to a user's finger or stylus.

In many embodiments, the electronic device 600 will include a high-resolution display 606 for presenting information to a user. Further, a low-resolution display 607 can optionally be used for presenting virtual keypads and other user interface information to the user as described in commonly assigned, copending '228 application cited above. In one embodiment, at least a portion of the substrate 101 can be placed beneath a display (either display 606, display 607, or both), as the display can be used for shielding purposes as described above.

Next, the capacitive force sensor 100 can be seen. In one embodiment, the capacitive force sensor includes a substrate 101 that is disposed beneath the fascia member 601. The substrate 101 may be coupled to a first plate 106. Alternatively, the upper components can serve as the first plate 106, thereby eliminating the need for an additional component.

The illustrative substrate 101 of FIG. 6 is fixed relative to the fascia member 601, such that the spacing between the fascia member 601 and the substrate 101 remains fixed as the user actuates the user interface. The substrate 101 includes at least one electrode pair disposed thereon. In the illustrative embodiment of FIG. 6, the at least one electrode pair includes a plurality of electrode pairs disposed in an arrayed configuration on the bottom of the substrate 101. The array, in one embodiment, comprises multiple electrode pair sensors. The multiple sensors can be arranged in a variety of ways, including in columns and rows, randomly, or in accordance with portions of the user interface that are likely to be actuated by a user.

In one embodiment, the substrate 101 is a flexible substrate. In one embodiment, the electrode pair is disposed along the flexible substrate in an interlaced pattern, with one electrode interlaced with the other, as shown in FIG. 2.

An electrically conductive plate 107, which is coupled to a ground node of the electronic device 600, is then disposed beneath the substrate 101. A compliance member 108,109 separates the substrate 101 from the electrically conductive plate 107, and provides an air gap therebetween. In one embodiment, the compliance member 108,109 comprises a combination of compressible material and metal springs. For example, a compressible foam and leaf spring combination is suitable for the compliance member 108,109. It will be clear that a single compliance member may be used rather than the combination.

Electronic circuitry 603 can then be seen. The electronic circuitry 603 includes a capacitive sensing circuit 604. The capacitive sensing circuit 604, which may be embodied by a microprocessor, programmable logic, or other control circuit, is electrically coupled to the electrode pair and receives input from the electrode pair. The capacitive sensing circuit 604, which can execute embedded firmware stored in an associated memory, is configured to determine the capacitive coupling of the electrode pair when the compliance member 107 is compressed. This "compressed" capacitance can then be compared to a "relaxed state" capacitance to determine an amount of force incident upon the fascia member 601 as descried above.

In one embodiment, a processing circuit 605, which can also be a microprocessor, programmable logic, or other controller, is included and is operable with the capacitive sensing circuit 604. The processing circuit 605 is configured with executable code to determine the contact force, which depends upon an amount of compression of the compliance member 108,109. Executable firmware stored in an associated memory (not shown) can be used to program the processing circuit 605 to make the force determination. For example, a reference capacitance, which is a measure of capacitance when the capacitive force sensor 100 is in a rest state, can be stored in memory. When the compliance member 108,109 is compressed, the capacitive sensing circuit 604 determines a compression capacitance using charge transfer sensing techniques or other suitable capacitive sensing means. The compression capacitance is then relayed to the processing circuit 605.

The processing circuit 605 then determines a magnitude of the contact force based upon a change between the compression capacitance and the reference capacitance. This can be accomplished by retrieving a spring factor (e.g., a spring constant) associated with the compliance member 108,109 from memory and then determining an amount of compression the compliance member 108,109 by employing the amount of compression and the spring factor to determine the magnitude of the contact force. Other calculations can be made as well. For example, an age compensation factor can be applied to the spring factor to compensate for loss of resilience over time.

The processing circuit 605, or the capacitive sensing circuit 604 for that matter, can be configured to provide a device actuation signal when the contact force exceeds a predetermined threshold. For instance, to eliminate inadvertent touch operation, the processing circuit 605 may be configured to determine whether the contact force exceeds a predetermined threshold, such as 0.10 lbs. Where so configured, the processing circuit 605 would not provide an actuation signal to the central controller or processor of the electronic device 600 unless the contact exceeded this force.

Figure 7:
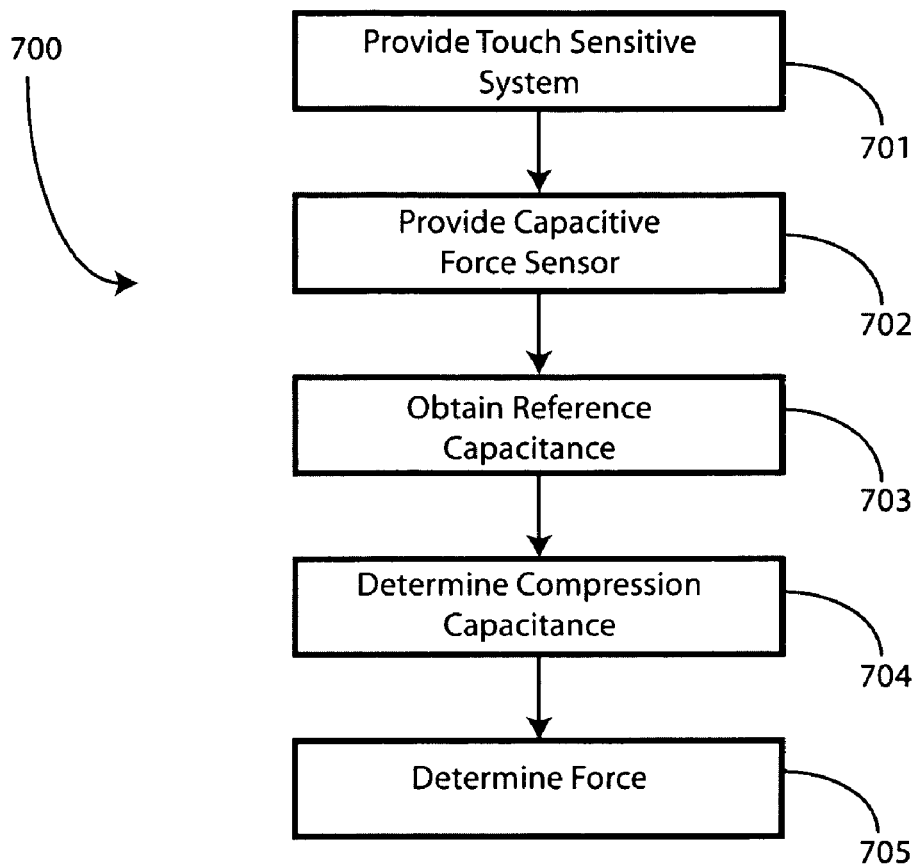
FIGS. 7 and 8 illustrate one method of using a capacitive force sensor to determine an impinging contact force in accordance with embodiments of the invention.

Turning now to FIG. 7, illustrated therein is a method 700 for determining a contact force being applied to a surface, such as a surface of an electronic device, in accordance with embodiments of the invention. The method is suitable for coding as firmware or software that is executable on a processor within an electronic device. Many of the steps have already been described above, so they will be briefly set forth here.

At step 701, a touch sensitive apparatus comprising a rigid surface and an electrically conductive, grounded plate, separated by a compliance member is provided. A substrate is also provided. The substrate, which is retained in a fixed relationship with the surface, includes at least one electrode pair. The at least one electrode pair, which can be configured in an interlaced geometric layout, is in one embodiment disposed on a single substrate on one side of the air gap defined by the substrate and the electrically conductive, grounded plate. Note that the at least one electrode pair can include multiple electrode pairs, each of which can be placed in an arrayed configuration of columns or rows.

At step 702, a capacitive sensing circuit, operable with the at least one electrode pair, is provided. The capacitive sensing circuit, as described above, is configured to detect a capacitance value associated with the electrode pair.

At step 704, the capacitive sensing circuit obtains a reference capacitance associated with the at least one electrode pair when the compliance member is in a rest state. This reference capacitance can be determined in real time by taking a measurement when the compliance member is in a rest state. Alternatively, the reference capacitance can be stored into memory during the manufacturing or calibration process.

At step 704, the capacitive sensing circuit determines a compression capacitance when the contact force is applied to the surface, thereby compressing the compliance member. At step 705, the capacitive sensing circuit determines a magnitude of the contact force based upon a change between the compression capacitance and the reference capacitance.

Figure 8:
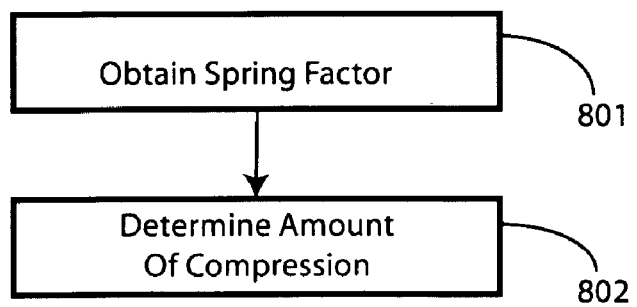

Turning now to FIG. 8, one illustrative embodiment of the determination of the contact force will be analyzed in more detail. At step 801, the capacitive sensing circuit obtains a spring factor associated with the compliance member. Often, this spring force member will be stored in memory when the capacitive force sensor is being manufactured. At step 802, the capacitive sensing circuit determines an amount of compression of the compliance member based upon the change between the compression capacitance and the reference capacitance as described above by employing the amount of compression and the spring factor to determine the magnitude of the contact force. As noted above, the capacitive sensing circuit can apply an age compensation factor to the spring factor when determining the contact force.

Prior art capacitive force sensors employ conventional parallel plate capacitors in which the two electrodes that form the capacitance are located on opposite sides of the dielectric material (air gap). Embodiments of the present invention offer numerous advantages over such prior art sensors. As described above, the capacitor pairs of embodiments of the present invention can be placed, in a controlled and cost effective manner, on a single substrate, either on one layer of the single substrate or on multiple layers. In so doing, the capacitor pairs are disposed on one side of the air gap existing between the ground plane and the substrate. This configuration is mechanically simpler and more robust than disposing capacitive plates on either side of the air gap. Next, the electrode pairs of embodiments of the present invention can be configured in arrayed orientations, and can be easily and cost effectively shielded from objects such as a user's finger.

Other advantages also exist. First, embodiments of the present invention can be optimized for sensing motion on a planer touch surface, such as reinforced glass, with the use of combination springs and electrodes configured in multiple arrays. Next, the spring action of the compliance member can be configured to have different characteristics in compression as compared to relaxation. The interlaced electrode configurations allow precise, easy, individual electronic calibration to provide a more uniform touch force calculation.

Further, as noted above, capacitive sensors for determining the proximate position of an object can be combined with the capacitive force sensor. In so doing, touch sensitive user interfaces can be designed with both location and force sensing capabilities. For simple touch sensitive keypad applications, the combination of the capacitive touch sensor layer and the capacitive force sensor can work together in unique ways. Where the output of the capacitive touch sensor and the capacitive force sensor are combined with AND logic, the possibility of false, unintended operation due to inadvertent contact with the user interface can be reduced.

Where an electronic device includes a touch sensitive user interface, such as a touch screen, embodiments of the present invention eliminate the need for unnatural "tap gestures" when selecting various functions of the device. For instance, this can be accomplished by first determining the proximate location of the user's stylus or finger. The processing circuit can then determine whether the contact is within a valid region or whether it corresponds to a particular user actuation target or icon. Where this is the case, the capacitive force sensing circuit can be configured to actuate that icon only when a predetermined force threshold is exceeded.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A capacitive force sensor, comprising:
   a substrate having at least one electrode pair defining a capacitance fixedly disposed thereon;
   a drive circuit configured to apply a voltage relative to a circuit ground to the at least one electrode pair;
   a first rigid plate, fixed relative to the substrate;
   a second plate electrically coupled to the circuit ground;
   a compliance member disposed between the first plate and the second plate, configured to mechanically separate the first plate and the second plate and to oppose a compression force while allowing the first plate to physically move relative to the second plate in response to the compression force; and
   a capacitance detection circuit configured to detect a change in the capacitance when the compliance member is compressed, wherein the change in the capacitance is dependent upon a change in distance between the first plate and the second plate.

2. The capacitive force sensor of claim 1, wherein the at least one electrode pair comprises a first electrode and a second electrode, wherein both the first electrode and the second electrode are disposed on a single substrate, on a same side of an air gap existing between the substrate and the second plate.

3. The capacitive force sensor of claim 1, wherein the compliance member comprises a shaped elastomer material.

4. The capacitive force sensor of claim 1, wherein the compliance member comprises one of a metal or a plastic spring mechanism.

5. The capacitive force sensor of claim 1, wherein the first plate is manufactured from one of glass, plastic, metal, or fiberglass.

6. The capacitive force sensor of claim 5, further comprising an electrical shield configured to electrically shield the at least one electrode pair from capacitively coupling with objects proximately located with the first plate.

7. The capacitive force sensor of claim 6, wherein the first plate comprises the electrical shield, wherein the electrical shield comprises an electrically conductive material that is coupled to the circuit ground or comprises electrically driven circuit coupled layer.

8. The capacitive force sensor of claim 1, further comprising a capacitive touch sensor configured to detect a proximate position of an object.

9. The capacitive force sensor of claim 1, wherein the at least one electrode pair comprises a first electrode and a second electrode disposed on a first side of the substrate, further comprising an electrode mesh disposed along a second side of the substrate above the at least one electrode pair, wherein the electrode mesh is electrically coupled to one of the first electrode or the second electrode.

* * * * *